No. 6,755. PATENTED OCT. 2, 1849.
W. A. CHAPIN, Jr.
TURNING LATHE.
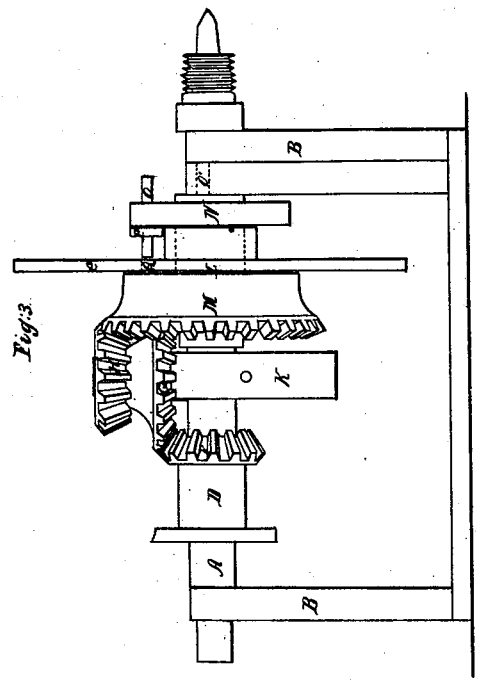
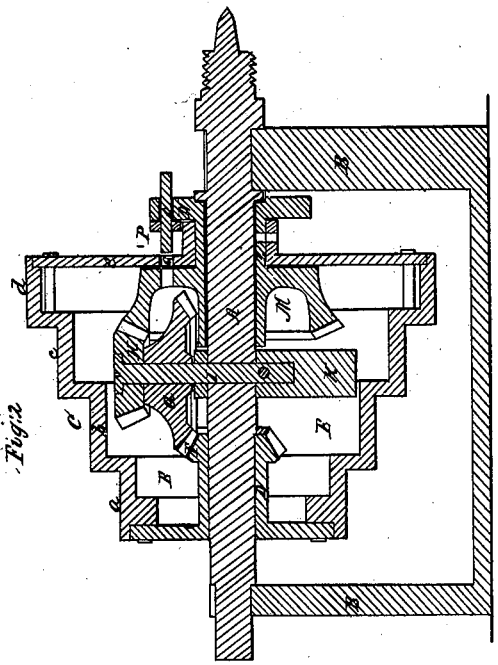
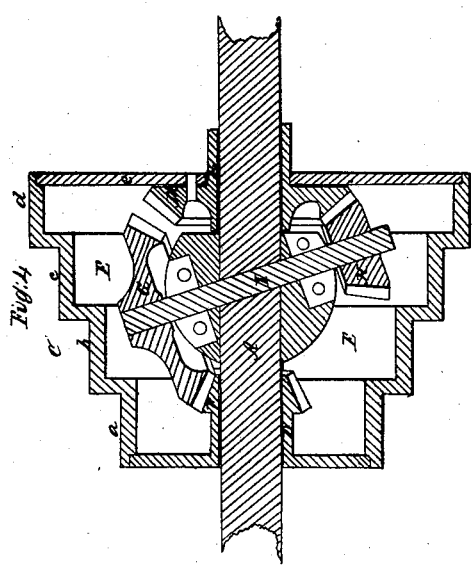
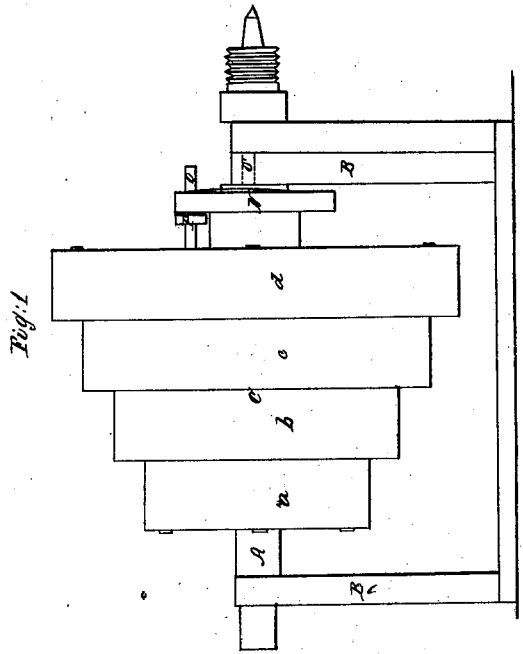

UNITED STATES PATENT OFFICE.

W. A. CHAPIN, JR., OF ST. JOHNSBURY, VERMONT.

VARYING THE SPEED OF MANDRELS IN LATHES.

Specification of Letters Patent No. 6,755, dated October 2, 1849.

*To all whom it may concern:*

Be it known that I, WILLIAM A. CHAPIN, Jr., of St. Johnsbury, in the county of Caledonia and State of Vermont, have invented a new and usefule Improvement in Turning-Lathes; and I do hereby declare that the same is fully described and represented in the following specification and accompanying drawings, letters, figures, and references thereof.

Of the said drawings, Figure 1, denotes a side elevation of a lathe mandrel, its driving pulleys, and supporting puppet head. Fig. 2 is a central, vertical, and longitudinal section thereof. Fig. 3 is a side elevation of the mandrel, and its speed reducing mechanism, as the same appears when the cone of pulleys is removed therefrom.

In the said drawings A, represents the mandrel; B, the puppet head or frame by which the mandrel is supported.

C, is a cone or series of four pulleys, *a*, *b*, *c*, *d*, of different diameters, the said cone being made of metal, and with a hollow concentric space E, within it and surrounding the mandrel. The cone of pulleys is so applied to the mandrel, as to be capable of being freely rotated thereon, the mandrel, and the pulleys having one common axis. A short tubular shaft D, is fixed to the smaller end of the pulley case, and extends within the space E, and has a beveled gear F, fastened to its inner end. This beveled gear engages with another beveled gear G, which is connected with another and smaller one H, so that they both simultaneously rotate on one common journal I, made to project from the mandrel A, and at right angles thereto. A balancing weight K, is applied to the opposite side of the mandrel, or in other words is made to extend therefrom, and in respect to the gears G, and H, and their journal I, as seen in the drawings. The mandrel passes through the tubular shaft D. There is also another tubular shaft L, which is placed on the mandrel, and at the larger end of the pulley case as seen in Figs. 2, and 3, this tubular shaft being likewise so applied to the mandrel as to be capable of being rotated on it. A beveled gear M, is fixed on the inner end of the tubular shaft L, while on the opposite or outer end of the said shaft a common disk, or circular plate N, is attached. The two beveled gears H, and M, are made to engage with one another. The respective diameters of the several bevel gears are represented by the drawings. The gear F, has thirteen teeth, the gear G, twenty one teeth; the gear H, thirteen teeth: and the gear M, thirty teeth. The diameter of the gears and the number of the teeth may be varied.

A small pin or bolt O, is inserted through the circular flanch plate N, and is made to slide freely back and forth therein in a direction of its length, the position of the said pin being shown in Fig. 2. On the said pin is a shoulder plate or button P, which not only serves to enable a person to readily slide the pin either backward or forward, but as a shoulder or stop to keep it in place. A hole Q, is made through the face plate *e*, of the cone of pulleys and in such a position that on its being brought around so as to be in line with the pin O, the latter may be slid into it in such manner as to so connect the cone of pulleys and the flanch plate N, that when the former is rotated the latter will be rotated with the same velocity as the former.

The pin O, being moved out of the hole Q, and so as to cause the end of the pin to project beyond the flanch plate N', and rest on top of or pass through a hole O' in the post of the puppet frame, if we put the cone of pulleys in revolution, by throwing a driving belt over any one of the pulleys, the consequence will be that the mandrel will be rotated at a velocity much less than that of the cone of pulleys; the object of my invention being to reduce the speed of the mandrel below that of the driving pulley. By sliding the pin O, into the hole, Q, we so lock the case of pulleys to the mandrel, that when the former is rotated a simultaneous and equal rotation of the latter takes place.

Fig. 4, is a central and longitudinal section of a mandrel and its cone of pulleys, and speed reducing mechanism, somewhat differently arranged from that before specified. In this case the mandrel is intended to be stationary, and to have what is termed a dead center point in its front end, the gear wheel M, being fixed to a tubular shaft R, which is placed and rotates on the mandrel. The two gears H, and G, are fixed on one shaft; the gear F, being connected with the cone of pulleys C.

What I claim is my invention is—

The combination of gears fixed to the cone of pulleys, and made to revolve with and by them; the two gears G, and H, affixed upon a shaft or axle extended or projected from the mandrel, a gear M, affixed on a tubular shaft, through which the mandrel extends, and in which it turns, and the tubular shaft D, the whole being applied to the mandrel and cone of pulleys, and made to operate in connection therewith, substantially, in manner, and for the purpose as above specified.

In testimony whereof I have hereto set my signature this eleventh day of April A. D. 1849.

WM. A. CHAPIN, Jr.

Witnesses:
J. P. FAIRBANKS,
HIRAM KNAPP.